United States Patent
Cros

(10) Patent No.: US 10,051,689 B2
(45) Date of Patent: Aug. 14, 2018

(54) HEATING HYDRAULIC INTERFACE FOR AN AUTOMOTIVE VEHICLE WINDSCREEN WASHER LIQUID FEED AND/OR DISTRIBUTION SYSTEM

(71) Applicant: Lionel Cros, La Roche Blanche (FR)

(72) Inventor: Lionel Cros, La Roche Blanche (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 1066 days.

(21) Appl. No.: 13/719,741

(22) Filed: Dec. 19, 2012

(65) Prior Publication Data

US 2013/0153558 A1 Jun. 20, 2013

(30) Foreign Application Priority Data

Dec. 19, 2011 (FR) .................................. 11 61934

(51) Int. Cl.
| | |
|---|---|
| *B60L 1/02* | (2006.01) |
| *H05B 1/02* | (2006.01) |
| *B60S 1/38* | (2006.01) |
| *B60S 1/48* | (2006.01) |
| *B60S 1/52* | (2006.01) |

(52) U.S. Cl.
CPC .......... *H05B 1/0252* (2013.01); *B60S 1/3862* (2013.01); *B60S 1/488* (2013.01); *B60S 1/524* (2013.01)

(58) Field of Classification Search
CPC ........ B60S 1/3862; B60S 1/488; B60S 1/524; B60S 1/3805; H05B 1/0252; B60L 1/02

USPC ................. 219/203; 392/311–312, 314, 320, 392/479–480, 482, 483, 485–486, 488; 15/250.32
See application file for complete search history.

(56) References Cited

U.S. PATENT DOCUMENTS

| | | | |
|---|---|---|---|
| 6,613,609 B1 * | 9/2003 | Laviron | G06K 19/02 438/112 |
| 2006/0196448 A1 | 9/2006 | Hayworth et al. | |
| 2010/0089893 A1 * | 4/2010 | Schlipf | B29C 45/1782 219/201 |
| 2011/0185531 A1 * | 8/2011 | Egner-Walter | B60S 1/381 15/250.01 |
| 2012/0167327 A1 * | 7/2012 | Kasack | B60S 1/488 15/250.04 |

FOREIGN PATENT DOCUMENTS

| | | | |
|---|---|---|---|
| FR | 2 804 395 A1 | 8/2001 | |
| WO | WO 2010034445 A1 * | 4/2010 | ............. B60S 1/381 |
| WO | 2011/032679 A1 | 3/2011 | |

OTHER PUBLICATIONS

Machine translation of WO 2010034445.*

(Continued)

*Primary Examiner* — Michael G Hoang
(74) *Attorney, Agent, or Firm* — Osha Liang LLP

(57) ABSTRACT

A hydraulic interface includes a first portion for channeling a liquid and a heating means supplied electrically. The heating means is fastened to the exterior face of the first portion, the hydraulic interface is configured to be installed between a liquid supply tube lying alongside an arm of a device for wiping a window of a vehicle, and the connector of the device for wiping a window of a vehicle is an intermediate component that fixes a wiping brush onto the arm.

16 Claims, 3 Drawing Sheets

(56) References Cited

OTHER PUBLICATIONS

Machine translation of WO 20110185531.*
Office Action dated Nov. 23, 2015, in corresponding Chinese Patent Application No. 201210599365.1 (with translation) (20 pages).
Notification of Reason for Rejection issued in corresponding Japanese Patent Application No. 2012-277168, dated Nov. 18, 2016 (5 pages).

* cited by examiner

HEATING HYDRAULIC INTERFACE FOR AN AUTOMOTIVE VEHICLE WINDSCREEN WASHER LIQUID FEED AND/OR DISTRIBUTION SYSTEM

BACKGROUND OF THE INVENTION

The technical sector of the present invention is that of windscreen washer liquid feed and/or distribution systems for automotive vehicle, and more particularly, hydraulic interfaces installed between a washing liquid inlet tube and a connector of the wiping device. Such a system accompanies an installation for wiping the windows of the vehicle.

Automobiles are commonly equipped with a wiping installation and a washing system to ensure wiping and washing of the windscreen and prevent the driver's view of his surroundings from being disturbed. These wiping installations comprise arms performing an angular to-and-fro motion at the extremity of which are installed elongate brushes, themselves carrying scraper blades made of an elastic substance. These blades rub against the windscreen and remove the water, taking it away from the driver's field of vision. The brush is attached to the rotating arm of the windscreen wiper by an assembly consisting of a mechanical connector and of an adaptor. The adaptor is a component which is fixed directly onto the structure of the brush, the connector being an intermediate component which allows the fixing of the adaptor onto the arm of the windscreen wiper. These two components are joined to one another by a transverse axis which permits their relative rotation.

The washing systems comprise an inlet device for a windscreen washer liquid which is conveyed from a reservoir situated in the vehicle and which is jetted towards the windscreen by nozzles generally situated on the bonnet, on the windscreen bay grille or on the windscreen wiper itself, for better distribution of the liquid. In the case of nozzles placed on the brushes, the windscreen washer liquid is conveyed by hoses which are fixed onto the arm of the windscreen wiper and which are connected to a system for distributing the liquid at the level of the connector. The connector thus comprises orifices able to receive, through a leaktight join, an element for connecting the hoses to the connector.

When the temperature of the windscreen washer liquid is too low, for example below 5° C., the windscreen washer liquid is heated up. Accordingly, a transport duct reheats the windscreen washer liquid tapped off from a reservoir by a pump when the control of windscreen washer is actuated, generally by the control lever placed alongside the steering wheel and driving inter alia the actuation of the windscreen wipers.

The connecting element installed between the hose and the connector is not heated. It is therefore liable to form a cold zone, where the washing liquid freezes. This situation is troublesome since this freezing, in discrete locations of the liquid feed and/or distribution system that are difficult to access, may render the washing function totally unavailable, although the remainder of the system may be heated.

Document WO2011/032679 proposes a solution to this problem by installing an electrical heating means in the connecting element. Now, the arrangement of this heating means does not satisfactorily solve the technical problem. Indeed, the distance which separates the means for heating the conduits to be unfrozen is relatively significant, so that the time necessary to unfreeze the channels of the connecting element is not compatible with the service level expected by a user of the vehicle, especially when the latter is a top-of-the-range vehicle. This represents a first drawback.

Moreover, the highly localized arrangement of the heating means involves significant electrical power in order to succeed in unfreezing the channels. Such power is problematic since it involves an electrical network rated for such power. This forms a second drawback.

Finally, the heating means is embedded in the connecting element, thereby complicating the manufacture of the latter.

BRIEF SUMMARY OF THE INVENTION

The invention proposes to improve the situation.

The aim of the present invention is therefore to solve the drawbacks described hereinabove mainly by arranging, especially by gluing, the heating means directly on an external face of the connecting element. The manufacture and the assembling of the interface are thus facilitated.

The subject of the invention is therefore a hydraulic interface able to be installed between a liquid supply tube, especially for a washing liquid, and a connector of a device for wiping a window of a vehicle, comprising at least one first portion able to channel the liquid and a heating means able to be supplied electrically, characterized in that the heating means is fastened at least on an exterior face of the first portion. Such a solution makes it possible to noticeably enlarge the area of heat exchange between the heating means and the hydraulic interface, while bringing the heating means as close as possible to the zone in which the liquid circulates, thereby enabling it to be unfrozen more rapidly than the device of the prior art. Installing the heating means on the exterior face facilitates is the fitting thereof since it suffices to fasten it against the exterior face.

According to a variant, a cavity is made in the exterior face, the heating means being arranged in the said cavity. Such a cavity makes it possible to house the heating means in the global perimeter of the first portion, thereby limiting any risk of damaging the heating means upon rubbing of the first portion, especially when replacing the wiping brush.

In such a case, the cavity is delimited by a flat bottom to which the heating means adheres. The flat character of the bottom facilitates the fitting and the adhesion of the heating means.

Advantageously, the first portion extends in a longitudinal direction corresponding to a direction along which the liquid is able to move in the first portion, the said heating means extending along a longitudinal axis parallel to the longitudinal direction. This therefore guarantees that the heating means extends over the length of the portion carrying this heating means, so as to limit the unheated zones.

In a preferential manner, the hydraulic interface comprises a second portion able to channel the liquid which is separated, that is to say adjacent and distinct, from the first portion and joined to the latter by a first bridge, the heating means being arranged both on the first portion and on the second portion. Thus, when the hydraulic interface comprises a plurality of conduits, it is possible to heat these conduits through a single heating means.

In this variant, the heating means runs over the bridge. This therefore ensures the link between a first heating means arranged on the first portion and a second heating means arranged on the second portion, adjacent to the first portion but separated from the latter at least by the first bridge.

According to an exemplary embodiment, the heating means comprises at least two parallel segments arranged on each portion able to channel the liquid. Such a solution increases the run of the track over one and the same portion and correlatively increases the area of exchange between the hydraulic interface and the heating means.

According to another exemplary embodiment, the heating means comprises a first segment running over the first portion and a second segment running over the second portion, the said ends of the first segment and of the second segment extending as far as opposite the first bridge and being joined together by a third segment running over the said first bridge. Such a solution presents the advantage of being simple to implement.

The heating means is preferably a resistive track and comprises at least two electrical connection points intended to be connected to an electrical source.

In a complementary manner, there is provided a second bridge joining the first portion to the second portion, the said connection points then being arranged on the second bridge. The second bridge thus serves as support to receive the connection points and presents the advantage of being arranged in proximity to the supply tube, from where the cables which provide the electrical energy necessary for the activation of the heating means emerge.

As a variant, the heating means comprises at least one electrical supply cable secured to the supply tube. Such a solution avoids the use of connection points serving to join the cables issuing from the supply tube and the hydraulic interface heating means.

In an optional manner, the hydraulic interface according to the invention comprises a fastening means intended to mechanically hold the hydraulic interface on the connector.

The heating means can also comprise a resistive track and an adhesive joining the resistive track to the portion able to channel the liquid. This solution for fastening the heating means on the exterior face of a portion in which the washing liquid is intended to circulate is simple to implement.

The invention also covers a system for feeding and/or distributing liquid for a wiping installation for automotive vehicle, comprising at least one liquid supply tube, an electrical energy source for the heating means and an interface comprising any one of the characteristics presented hereinabove.

Advantageously, the heating means comprises at least two electrical connection points, each cable being fastened to an electrical connection point connected to an electrical supply cable.

In such a configuration, at least one connection point is covered by a protection device. This therefore avoids damage, especially by tearing or by corrosion, to the connection between the cable and the connection point. Such a protection device also ensures leaktightness which prevents water penetration at the level of the electrical contact between the cable and the relevant connection point.

According to an exemplary embodiment, the protection device is a pad in contact with the electrical connection point and which overlaps an end of the conducting strand of the cable fastened to the electrical connection point.

As a variant, the means for heating the hydraulic interface can comprise at least one electrical supply cable secured to the supply tube.

BRIEF DESCRIPTION OF THE SEVERAL VIEWS OF THE DRAWINGS

Other characteristics, details and advantages of the invention will emerge more clearly on reading the description given hereinafter by way of indication in conjunction with drawings in which.

DETAILED DESCRIPTION OF THE INVENTION

Figure 1:
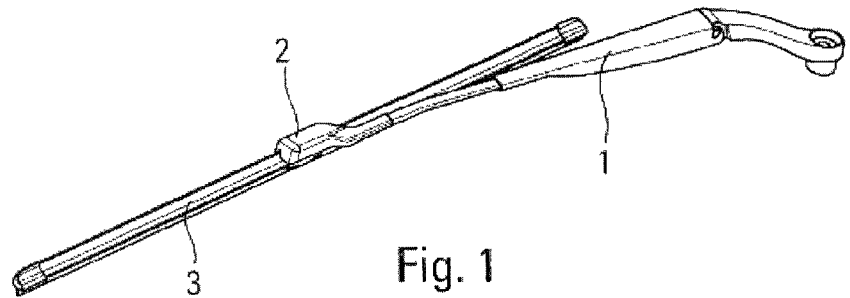
FIG. 1 is a general view, in perspective, of a wiping device for automotive vehicle.
Figure 2:
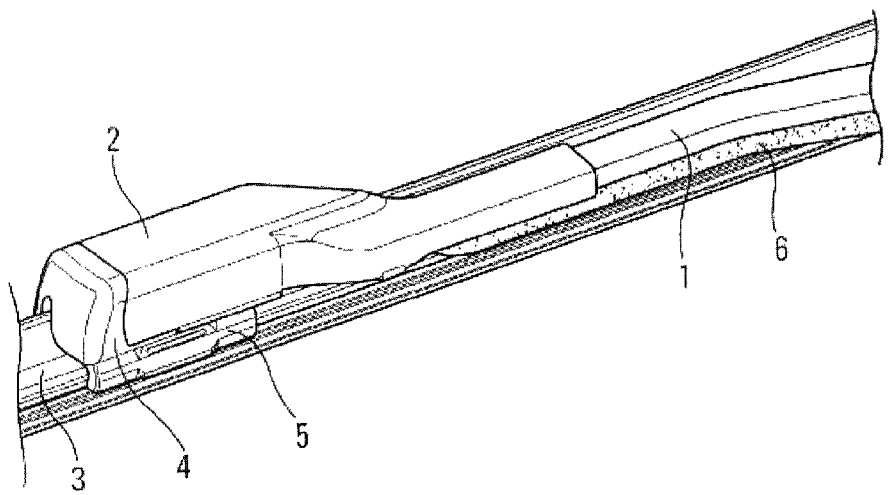
FIG. 2 is a detail view of FIG. 1.

Referring to FIGS. 1 and 2, depicted therein is a wiping device for a window of an automotive vehicle, otherwise called a windscreen wiper, composed of a brush-holder or arm 1 terminating at its external end in a clevis 2, which is fixed, especially, by crimping onto the arm 1. In an alternative manner, this clevis can also be formed at the arm end by deformation of the latter and constitute a unit assembly with the arm. The function of the latter is, by way of an adaptor 5 and of a connector 4, to support a wiping brush 3.

The adaptor 5 is crimped onto the wiping brush 3 and ensures transmission of the loads to the brush, whilst the connector 4 is an intermediate component ensuring on the one hand compatibility between various shapes of clevis and one and the same wiping brush, and on the other hand the transport and the distribution of the washing liquid to the wiping brush.

A washing liquid supply tube 6 lies alongside the arm 1 as far as the connector 4. According to a first variant of the invention, such a supply tube comprises a single inlet conduit for the washing liquid. According to another variant of the invention, the supply tube 6 comprises a plurality of conduits, especially two, separated from one another by the constituent material of the supply tube.

Such a configuration is particularly suited to the case where the wiping device comprises a wiping brush 3 equipped with jetting racks which extend along a longitudinal axis defining the length of the wiping brush.

According to the invention, the connector 4 can also ensure the transport of electrical energy intended to supply a heating device integrated into the wiping is brush 3.

Figure 3:
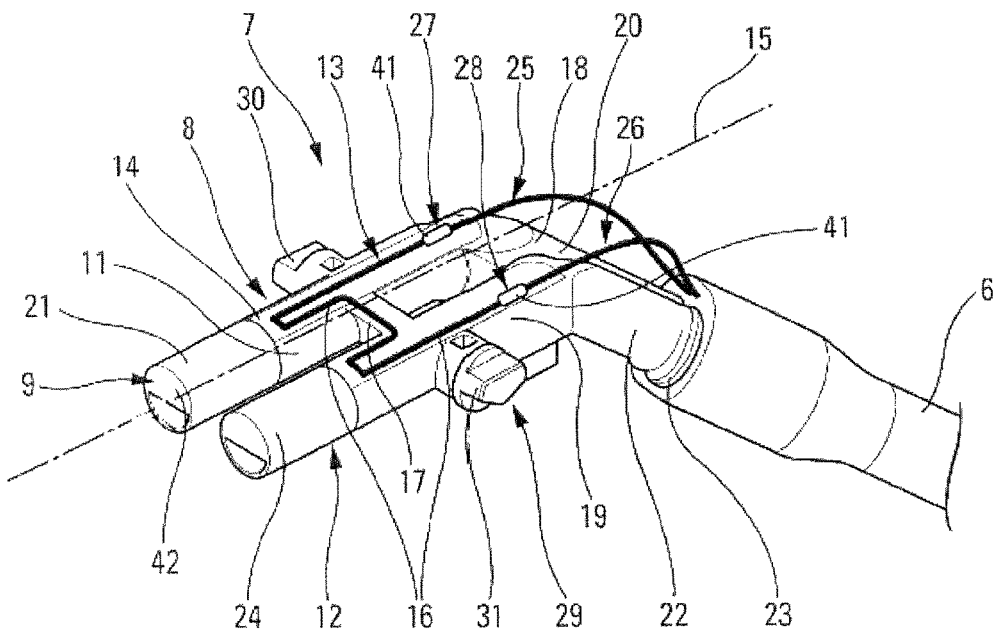
FIG. 3 is a perspective view of a hydraulic interface according to the invention.

The supply tube 6 is connected at least mechanically and hydraulically to the connector 4 by a hydraulic interface 7 according to the invention, visible in FIG. 3. The function of this interface is especially to facilitate the removability of the supply tube in relation to the connector, when replacing the wiping brush because of wear thereto, for example.

The interface 7 is hydraulic in the sense that it channels the washing liquid between the supply tube 6 and the connector 4. Accordingly, the hydraulic interface 7 comprises a first portion 8 able to contain the washing liquid. Such a first portion takes the form of a duct of globally circular cross-section. It will be noted that according to a variant, the internal cross-section of this first portion may be a combination of a circular arc and of a flat, the flat making it possible to fashion a zone 42 in which a cavity is fashioned, as will be detailed hereinafter.

This first portion 8 is delimited by a wall 9 which exhibits an interior face in contact with the washing liquid, and an exterior face 11 in contact with the air surrounding the hydraulic interface 7.

The hydraulic interface 7 comprises a second portion 12 of identical structure to the first portion 8. The explanations given hereinbelow in relation to the first portion are transposable to the second portion.

According to the invention, the hydraulic interface 7 carries a heating means 13 whose function is to transform the electric current which passes through it into heat to be dissipated at the level of the first portion. This heating means is fastened, that is to say firmly fixed, against the exterior face of the first portion. By way of example, the heating means 13 may be glued against the exterior face 11. In a complementary manner, such gluing can intervene by means of an adhesive band interposed between the heating means 13 and the exterior face 11 of the first portion.

In an advantageous manner, the first portion 8 comprises a cavity 14 in which the heating means 13 extends. Such a cavity 14 is a deformation of the exterior face 11 towards the interior face of the first portion 8, so as to form a flat zone, otherwise called a flat bottom, on which the heating means is fastened. Stated otherwise and by way of example, a flat land, against which the heating means is stuck, is fashioned over the whole of the length of the exterior face 11.

The first portion 8 is a hose which extends along a length defined by the direction followed by the liquid when it passes through the first portion. This length forms a longitudinal direction illustrated by reference 15 in FIG. 3. The heating means 13 forms a rectangular band which extends along a longitudinal axis which delimits its length, such an axis is then advantageously parallel to the longitudinal direction 15 followed by the first portion 8.

The hydraulic interface 7 according to the invention further comprises a third portion 20 able to channel the washing liquid and connected to the first portion 8. This third portion 20 is installed so as to form a non-zero angle with the longitudinal direction 15 along which the first portion 8 extends. A free end of this third portion 20 is housed inside one of the conduits formed in the supply tube 6, a frontal face of the tube then abutting against a collar made on the exterior face of the third portion 20. It will also be noted that the first portion 8 exhibits an end 21 of circular exterior cross-section, intended to enter the connector of the wiping device. Like the first portion 8, the second portion 12 is also connected to a fourth portion 22 which exhibits a collar 23 forming an abutment to counter a translation of the supply tube 6 on the third and/or the fourth portion. This second portion 12 further comprises an end 24 intended to penetrate into the connector of the wiping device.

The heating means 13 can for example be formed of a resistive track 16 which runs over the first portion. According to a variant not represented, the interface comprises a heating means dedicated to each portion of the interface, it then being possible for these heating means to be independent of one another. The variant of FIG. 3 shows a single heating means which runs at one and the same time on the first portion 8 and on the second portion 12.

The heating means 13 is advantageously formed by a flexible sheet on one face of which the resistive track is fixed, the other face of the sheet receiving an adhesive to cause the heating means to adhere to the relevant portion of the hydraulic interface 7.

The second portion 12 is joined mechanically to the first portion 8 by at least one first bridge 17. This first bridge is a zone of smaller length than the length of the first or of the second portion 8 and 12. Stated otherwise, there exists a gap between the first portion 8 and the second portion 12 on either side of the first bridge 17.

The two portions 8 and 12 able to channel the washing liquid are further joined to one another by a second bridge 18 fashioned at one and the same end of the first portion 8 and of the second portion 12, here situated in proximity to the third portion 20 and the fourth portion 22. The second bridge 18 is thus separated from the first bridge 17 by a gap, otherwise called a void, which extends between these two bridges and between these two portions able to channel the washing liquid.

According to one embodiment of the invention, the heating means 13 is arranged both on the first portion 8 and on the second portion 12. In such a case, this entails one and the same heating means. The resistive track then runs over the exterior face 11 of the first portion 8, and then over an exterior face of the first bridge 17, and then over an exterior face 19 of the second portion 12.

The heating means 13 is connected to an electrical energy source which takes, for example, the form of two cables 25 and 26. The electrical connection between these two cables and the heating means is effected at the level of two electrical connection points, referenced 27 and 28. According to an exemplary embodiment, not represented, the two connection points may be arranged on one and the same portion, first or second portions of the hydraulic interface, able to channel the washing liquid. This is especially the case when there is provision for a heating means dedicated to a single portion.

In the example of FIG. 3, a first connection point 27 is arranged on the first portion 8 whilst a second connection point 28 is arranged on the second portion 12. In such a case, the resistive track runs from the first connection point 27 over the first portion 8, over the first bridge 17, over the second portion 12 to arrive at the second connection point 28.

Advantageously, the first connection point 27 and the second connection point 28 may be placed on the second bridge 18, the latter forming a zone facilitating the connection of the cables to the connection points, while being close to the supply tube 6 from which the cables 25 and 26 emerge. This is, however, an exemplary embodiment and the invention covers the case where the connection points are arranged on the resistive track in a location other than the second bridge, such as for example the first bridge 17.

Each of the cables comprises an electrically insulating sheath which surrounds a conducting strand. The latter is connected to each connection point, for example by soldering. The material from which the resistive track 16 is manufactured is for example copper, or else an aluminium alloy.

The hydraulic interface 7 further comprises a fastening means 29 able to mechanically hold the hydraulic interface 7 on the connector of the wiping device. This fastening means 29 takes the form of two protuberances which extend along axes perpendicular to the longitudinal direction 15 of the first portion 8. A first protuberance 30 emerges from the first portion 8 whilst a second protuberance 31 emerges from the second portion 12.

In an optional manner, the hydraulic interface can also comprise a reception device (not represented) for an electrical connector intended to supply a heating element integrated into the wiping brush. For example, such a reception device can take the form of a rail or of a rib fastened on the first bridge 17 and/or on the second bridge 18. It can also be a "U"-shaped pin-shank whose branches issue from the first portion 8 and from the second portion 12.

Figure 4:
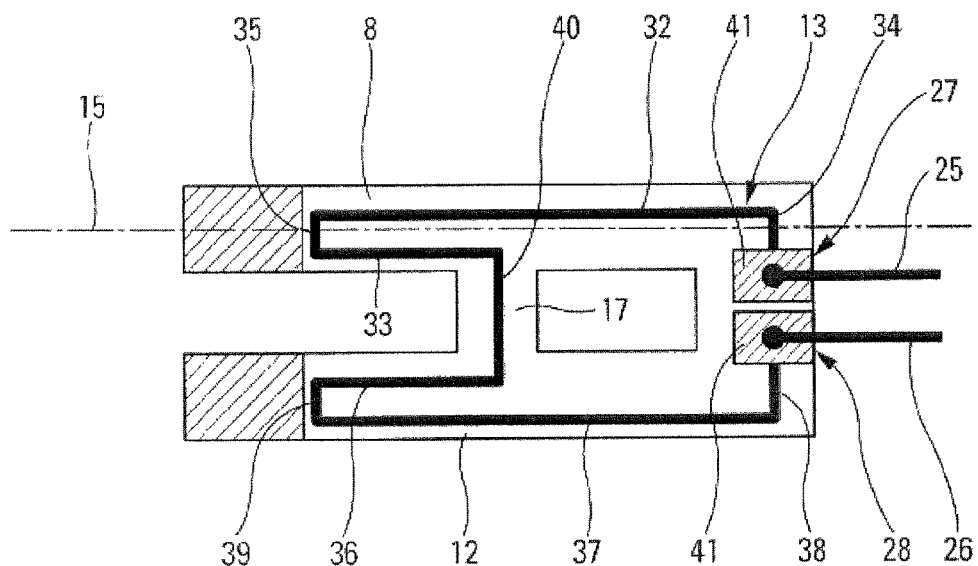
FIG. 4 is a schematic view showing the run of a heating means over the hydraulic interface according to the invention.

FIG. 4 illustrates the particular run of the resistive track 16 forming an exemplary embodiment of the heating means 13. The resistive track 16 comprises at least two parallel segments arranged on each portion able to channel the liquid, that is to say the first portion 8 and/or the second portion 12. A first pair of parallel segments arranged on the first portion 8 is formed by a first segment 32 and a second segment 33 which each extend along an axis parallel to the longitudinal direction 15. Another pair of segments, both extending perpendicularly to the longitudinal direction 15, is formed by a third segment 34, joining the first segment 32 to the first connection point 27, as well as a fourth segment 35, joining the first segment 32 and the second segment 33 and intended to be arranged in proximity to the connector 4.

The same goes for the segments formed on the second portion 12, the resistive track being formed by a pair of fifth and sixth segments 36 and 37, and another pair of seventh and eighth segments referenced 38 and 39. The arrangement of the fifth, sixth, seventh and eighth segments is identical to that of the first, second, third and fourth segments such as presented hereinabove. A joining segment 40 runs over the first bridge 17 to join the second segment 33 with the fifth segment 36.

In the example of FIGS. 3 and 4, the resistive track of the heating means 13 terminates at the level of the ends referenced 21 and 24, without overlapping them.

According to a variant of the invention, not represented, at least one of these ends, and advantageously both ends 21 and 24, comprise a housing fashioned in the zone 42 and closed by the wall of the hydraulic interface, at the level of these ends. This housing thus extends over the length of the end 21 or 24. The resistive track can then extend in this housing so as to dissipate heat as far as the end of the hydraulic interface threaded into the connector of the wiping brush. This is therefore increases the heated area and reduces the risk of the washing liquid freezing. This housing also forms a cowl which protects the extremity of the resistive track, although the end is threaded into the connector.

Figure 5:
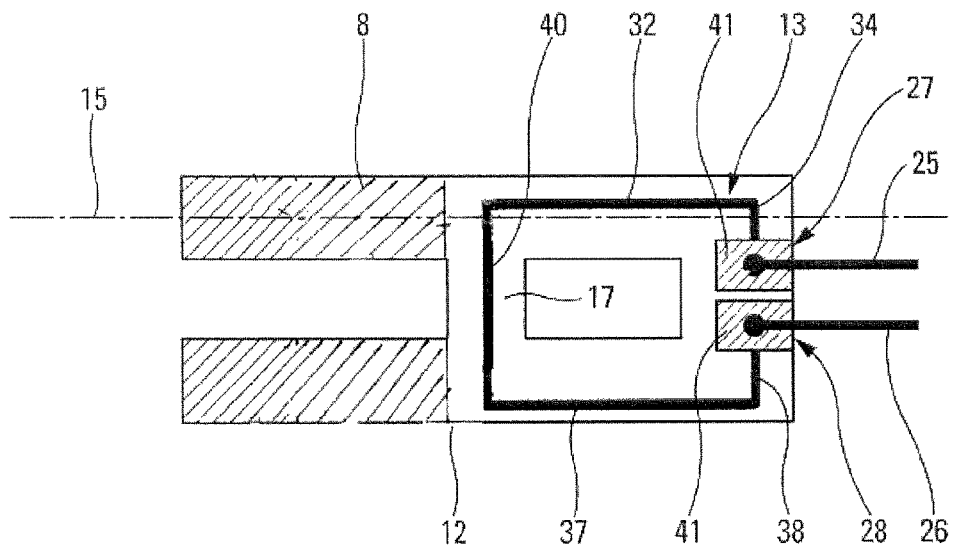
FIG. 5 is a schematic view showing the run of a heating means over the hydraulic interface according to a variant embodiment.

According to another variant represented in FIG. 5, the run of the heating means may be simplified so as not to extend to the levels of the ends 21 and 24. Thus, the heating means 13 can stop opposite the first bridge 17. The heating means 13 then comprises five segments, two segments 32 and 37 each running respectively over the first portion 8 and over the second portion 12, a third segment 40 running over the first bridge 17 and joining the first segment 32 to the second segment 37, and a fourth segment and a fifth segment 34 and 38 joining respectively the first segment 32 to the first connection point 27 and the second segment 37 and second connection point 28.

The hydraulic interface 7 according to the invention is manufactured from a polymeric material, for example by moulding. It will be noted most particularly that the first portion 8, the second portion 12, the third portion 20, the fourth portion 22, the first bridge 17 and the second bridge 18 form one single component, made according to one and the same moulding operation, advantageously from one and the same polymeric material.

The assembly formed by the liquid supply tube 6, the two cables 25 and 26 forming an electrical energy source and the hydraulic interface 7 according to the invention presented hereinabove, forms at least one part of a system for feeding and/or distributing liquid for a wiping installation for automotive vehicle.

In an advantageous manner, the two cables 25 and 26 are embedded in the constituent substance of the supply tube 6. They advantageously extend between the two conduits formed in the supply tube 6.

The electrical connection between the conducting strand of a cable and its respective connection point is protected from exterior attack by a protection device 41, which covers the connection point at the location where the strand is soldered. By way of example, such a protection device 41 takes the form of a pad in contact with the electrical connection point and which overlaps an end of the conducting strand fastened to the electrical connection point. Such a pad is for example produced by a thermosetting resin drop deposited on the connection point.

As a variant, the heating means 13 fastened to the hydraulic interface 7 can consist of at least one of the cables 25, 26 secured to the supply tube 6. Such a heating means may be implemented for each embodiment described hereinabove. Such a heating means presents the advantage of avoiding the connection between the cables issuing from the said tube and an add-on resistive track affixed to the hydraulic interface 7.

The invention claimed is:

1. A hydraulic interface comprising:
at least one first portion for channeling a liquid; and
a heating means supplied electrically,
wherein the heating means is fastened at least on an exterior face of the first portion, and
wherein the hydraulic interface is configured to be installed between a liquid supply tube lying alongside an arm of a device for wiping the window of a vehicle and a connector of the device for wiping the window of the vehicle, the connector being an intermediate component which allows the fixing of wiping brush onto the arm.

2. The interface according to claim 1, wherein the exterior face comprises a cavity, the heating means being arranged in the cavity.

3. The interface according to claim 2, wherein the cavity is delimited by a flat bottom to which the heating means adheres.

4. The interface according to claim 1, wherein the first portion extends in a longitudinal direction corresponding to a direction along which the liquid moves in the first portion, the said heating means extending along a longitudinal axis parallel to the longitudinal direction.

5. The interface according to claim 1, further comprising a second portion for channeling the liquid, separated from the first portion and joined to the latter by a first bridge, the said heating means being arranged both on the first portion and on the second portion.

6. The interface according to claim 5, wherein the heating means runs over the first bridge.

7. The interface according to claim 5, wherein the heating means comprises at least two parallel segments arranged on each of the first and second portions.

8. The interface according to claim 6, wherein the heating means comprises a first segment running over the first portion and a second segment running over the second portion, the ends of the first segment and of the second segment extending as far as opposite the first bridge and being joined together by a third segment running over the first bridge.

9. The interface according to claim 5, wherein the heating means being a resistive track comprising at least two electrical connection points intended to be connected to an electrical source.

10. The interface according to claim 9, wherein there is provided a second bridge joining the first portion to the second portion, the at least two electrical connection points being arranged on the second bridge.

11. The interface according to claim 1, wherein the heating means comprises at least one electrical supply cable secured to the supply tube.

12. The interface according to claim 1, further comprising a fastening means for holding the hydraulic interface on the connector.

13. A system for feeding and distributing liquid for a wiping installation for an automotive vehicle, comprising:
   a hydraulic interface comprising:
      at least one first portion for channeling the liquid; and
      a heating means supplied electrically,
         wherein the heating means is fastened at least on an exterior face of the first portion;
   at least one liquid supply tube; and
   an electrical energy source for the heating means,
   wherein the hydraulic interface is configured to be installed between the at least one liquid supply tube lying alongside an arm of a device for wiping a window of the automotive vehicle and a connector of the wiping installation for the automotive vehicle, the connector being an intermediate component which allows the fixing of wiping brush onto the arm.

14. The system according to claim 13, wherein the heating means comprises at least two electrical connection points, and wherein an electrical supply cable is fastened to each of the at least two electrical connection points of the heating means.

15. The system according to claim 14, wherein at least one of the at least two electrical connection points is covered by a protection device comprising a pad in contact with the at least one of the at least two electrical connection points and covering an end of a conducting strand of the electrical supply cable fastened to the at least one of the at least two electrical connection points.

16. The system according to claim 13, wherein the heating means of the hydraulic interface comprises at least one electrical supply cable secured to the supply tube.

* * * * *